United States Patent
Kümmel et al.

(10) Patent No.: US 11,327,800 B2
(45) Date of Patent: May 10, 2022

(54) TECHNICAL PROCESS CONTROL IN MULTI-COMPUTING-CORE SYSTEM

(71) Applicant: Beckhoff Automation GmbH, Verl (DE)

(72) Inventors: Richard Kümmel, Bielefeld (DE); Manuel Bettenworth, Gütersloh (DE); Henning Zabel, Minden (DE); Jan Achterberg, Duisburg (DE); Dirk Janssen, Verl (DE)

(73) Assignee: Beckhoff Automation GmbH, Verl (DE)

( * ) Notice: Subject to any disclaimer, the term of this patent is extended or adjusted under 35 U.S.C. 154(b) by 316 days.

(21) Appl. No.: 16/502,300

(22) Filed: Jul. 3, 2019

(65) Prior Publication Data

US 2019/0324815 A1 Oct. 24, 2019

Related U.S. Application Data

(63) Continuation of application No. PCT/EP2017/008165, filed on Nov. 23, 2017.

(30) Foreign Application Priority Data

Jan. 13, 2017 (DE) .................... 10 2017 100 655.9

(51) Int. Cl.
*G06F 9/46* (2006.01)
*G06F 9/50* (2006.01)
(Continued)

(52) U.S. Cl.
CPC ......... *G06F 9/5027* (2013.01); *G05B 19/042* (2013.01); *G06F 9/52* (2013.01)

(58) Field of Classification Search
CPC ........ G06F 9/5027; G06F 9/52; G05B 19/042
See application file for complete search history.

(56) References Cited

U.S. PATENT DOCUMENTS 5,887,143 A 3/1999 Saito et al.
2009/0007117 A1* 1/2009 Cho .................. G06F 9/5027
718/100

(Continued)

FOREIGN PATENT DOCUMENTS

| DE | 102009047024 A1 | 5/2011 |
| DE | 102006052757 B4 | 10/2014 |
| WO | 2012027907 A1 | 3/2012 |

OTHER PUBLICATIONS

Moyer, B. "The promises and challenges of multicore concurrency." Feb. 14, 2015, obtained Jul. 2, 2019 from <https://www.embedded.com/print/4438659>, 20 pages.

(Continued)

*Primary Examiner* — Gregory A Kessler
(74) *Attorney, Agent, or Firm* — Dorsey & Whitney LLP

(57) ABSTRACT

To control a technical process comprising a control task for independently controllable modules, modules are each assigned to a computing core on a controller with a plurality of computing cores. The technical process is connected to the controller via at least one communication connection. In a first time segment, the controller provides read-in input data of the modules for the respectively associated computing core. Subsequently, synchronization of the computing cores to which modules are assigned is carried out by the controller. In a second time segment, the computing cores process the input data of the modules to generate output data for the modules, wherein each computing core signals the end of processing. As soon as all computing cores have signaled the end of processing, the output data are provided in a third time segment by the controller in order to be provided to the modules on the communication connection.

20 Claims, 7 Drawing Sheets

(51) Int. Cl.
*G05B 19/042* (2006.01)
*G06F 9/52* (2006.01)

(56) References Cited

U.S. PATENT DOCUMENTS

2016/0236077 A1* 8/2016 Baust .................. A63F 13/23
2018/0189105 A1* 7/2018 Sanghvi ............... G06F 9/4812

OTHER PUBLICATIONS

Translation of German Patent Publication No. DE102006052757, published Oct. 9, 2014 to Siemens AG, 16 pages.

* cited by examiner

TECHNICAL PROCESS CONTROL IN MULTI-COMPUTING-CORE SYSTEM

CROSS-REFERENCE TO RELATED APPLICATIONS

This patent application claims the priority of PCT Application Number PCT/EP2017/080165 filed Nov. 23, 2017, entitled "Controlling of a Technical Process in a Multi-Computing System," and German Patent Application DE 10 2017 100 655.9, filed Jan. 13, 2017, entitled STEUERUNG EINES TECHNISCHEN PROZESSES AUF EINER MEHR-RECHENKERN-ANLAGE, each of which is incorporated by reference herein, in the entirety and for all purposes.

FIELD

The present invention relates to a method for controlling a technical process which comprises a control task for a number of independently controllable modules, on a controller having a plurality of computing cores, wherein the technical process comprises at least a communication connection with the controller for exchanging data. The present invention further relates to a corresponding controller for the technical process and a drive system with such a controller.

BACKGROUND

The controlling of technical processes is usually carried out by memory-programmable controllers. In this context, a calculation system is usually employed in order to carry out a control program having individual control tasks, the control program retrieving the states of the technical process in order to then control the technical process on the basis of the states to be determined. The individual control tasks of the control program are in this context usually carried out in a cyclic manner within a fixed time frame. Complex technical processes may, however, comprise a multitude of independently controllable modules and make high demands to the performance of the calculation system.

To a certain degree, the increased demands to the controller may be met by a higher-clocked computer. Due to physical conditions, this kind of improved performance may not be continued at will. Another possibility is to use computers that comprise a plurality of computing cores operating in parallel. The distribution of control tasks by allocating to various computing cores increases the computing time available within a predetermined time frame. Furthermore, individual control tasks may be divided up into independent sub-tasks and carried out in parallel on various computing cores.

Parallelized control programs, however, have so far hardly been used in industrial automation. The control programs are largely designed for execution on a computing core and not configured for parallel processing. When automation systems use multi-core processors, parallel processing is usually limited to assigning individual control tasks to available computing cores. A controller for a technical process involving a multitude of computing cores to each of which a control task of the technical process is assigned is e.g. known from DE 10 2006 052 757 B4.

Said parallelization concept, however, reaches its limits if the computing time required for an individual control task exceeds the predetermined cycle time. In this case, a reduction of the computing time may be achieved by distributing the calculations to the existing computing cores within the control task itself. Usually, however, such a parallelization requires a complex and time-involving reconfiguration when implementing the control task.

SUMMARY

The present invention provides a technical process comprising a control task for a number of independently controllable modules on a controller comprising a plurality of computing cores in such a way that the entire processing time is reduced and shorter cycle times are made possible without necessitating a complex and time-involving reconfiguration.

EXAMPLES

According to one aspect, in order to control a technical process comprising a control task for a number of independently controllable modules, the modules are each assigned to a computing core on a controller that comprises a plurality of computing cores. The technical process is connected to the controller via at least a communication connection for exchanging data. In a control cycle, the controller, in a first time segment, provides read-in input data of the modules to the respectively associated computing core via at least one I/O unit of the controller. Subsequently, the controller synchronizes the computing cores to which modules are assigned. The computing cores then, in a second time segment, process the input data of the modules that are associated to the respective computing core in order to generate output data for the modules, with each computing core signaling the end of processing. When all computing cores have signaled the end of processing, the output data for the modules are provided by the controller in a third time segment in order to be sent to the modules via the I/O unit on the communication path.

According to a further aspect a controller comprises a control task for a number of independently controllable modules, the modules are each assigned to a computing core on the controller that has a plurality of computing cores. The technical process is connected to the controller via at least one communication connection in order to exchange data. In a first time segment, the controller provides read-in input data of the modules for the respectively associated computing core via at least one I/O unit, wherein subsequently a synchronization of the computing cores to which modules are assigned is carried out by the controller. In a second time segment the computing cores process the input data of the modules that are assigned to the respective computing core in order to generate output data for the modules, wherein each computing core signals the end of processing. As soon as all computing cores have signaled the end of processing, the output data for the modules are provided in a third time segment by the controller in order to be provided to the modules on the communication connection by the I/O unit.

According to a further aspect a drive system comprise a number of drive elements as independently controllable modules and a controller, the modules are each assigned to a computing core on the controller that has a plurality of computing cores. At least one I/O unit of the controller is configured to exchange data with the modules via a communication connection. In a first time segment, the controller provides read-in input data of the modules for the respectively associated computing core via at least one I/O unit, wherein subsequently a synchronization of the computing cores to which modules are assigned is carried out by the controller. In a second time segment the computing cores process the input data of the modules that are assigned to the respective computing core in order to generate output data for the modules, wherein each computing core signals the end of processing. As soon as all computing cores have signaled the end of processing, the output data for the modules are provided in a third time segment by the controller in order to be provided to the modules on the communication connection by the I/O unit.

The parallelization of the control task of a technical process having a variable number of independently controllable modules provides distributing the calculation for controlling the modules individually to the available computing cores during the configuration phase. The user then only has to decide on how many or, respectively, on which computing cores the control task is to be carried out in parallel. The flexible distribution allows for a clear reduction of the total computing time for the controller in complex technical processes.

At least one of the steps of providing the input data, processing the input data to result in output data and providing the output data may be divided up into at least two segments to which a processing routine—in the following referred to as task—is assigned wherein a synchronization is carried out between the two segments. By such a procedure, parallelization may further be increased when providing the input data or the output data and when completing the control routines and thus the total computing time of the control cycle may additionally be shortened.

The input data of the modules are provided to the respectively assigned computing core in an associated memory area. The computing cores may then complete their respectively allocated tasks or routines without encumbering or blocking one another. A number of computing cores may also, however, share a memory area. The input data of the modules may generally be provided to the computing cores in a shared memory area. This guarantees a fast data exchange in the controller.

In an initializing phase, a computing core detects the independently controllable modules, wherein the detected modules are each allocated to a computing core according to at least one predetermined criterion. By this method, a flexible parallelization concept is enabled which may quickly be adapted to the demands of the technical process.

Independently controllable modules with special safety demands are distributed to various computing cores whereby safety criteria provided for the technical process may easily be met.

The technical process is connected to the controller via a plurality of communication paths for exchanging data, wherein the controller comprises a plurality of I/O units that are configured to exchange data via an associated communication connection to the technical process. One computing core is then assigned to each I/O unit, the computing core being configured to provide input and output data for the respectively associated I/O unit. By this method, the processes upstream and/or downstream of the actual calculation may be parallelized in the control cycle, thus allowing for very short cycle times.

The technical process comprises a motion control of the independently controllable modules, wherein the controller is configured to carry out the motion control of the independently controllable modules.

A drive system comprises a plurality of motor module that each comprise a travel and a plurality of independently energizable driving coils arranged alongside the travel. The drive elements of the drive system that are independently controllable modules each comprise a magnetic unit in order to be moved by the driving coils. A number of motor modules from the plurality of motor modules in this context serves as feed modules for the plurality of motor modules, wherein the feed modules are each connected to the controller via a communication path.

An I/O unit of the controller is designed to exchange data with the feed modules via a plurality of communication paths.

BRIEF DESCRIPTION OF THE DRAWINGS

The invention is explained in greater detail below on the basis of exemplary embodiments with reference to figures, in which.

The same reference symbols can be used for the same features below. Furthermore, for the sake of clarity, provision is made for not all features to always be depicted in all drawings. A placeholder in the form of a geometric object is sometimes used for a group of features, for example.

DETAILED DESCRIPTION

Figure 1:
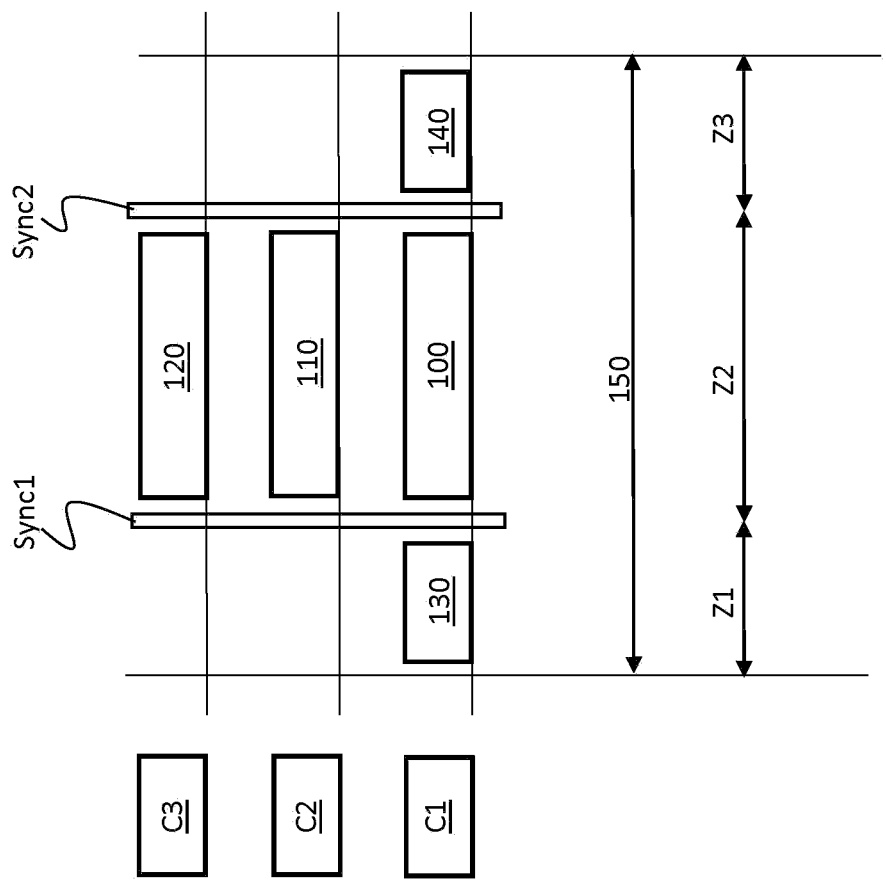
FIG. 1 schematically shows an inventive control cycle for carrying out a control task for a plurality of independently controllable modules of a technical process on a controller having three computing cores, the controller comprising a communication path for exchanging data with the technical process.

In industrial automation, increasingly complex and intelligent manufacturing platforms are used that necessitate an ever increasing computing power and thus require the use of a powerful controller. Control tasks of technical processes, in particular those controlling the motions of a large number of independently controllable modules are frequently characterized by very short cycle times that have to be passed through in a highly precise manner in order to be able to keep up with the required real-time conditions. In this context, large amounts of input and output data frequently have to be exchanged between the technical process and the controller. Within the framework of motion control, functions that involve a lot of computing time such as control algorithms, generation of set values and transformation of coordinates have to be carried out.

A high computing performance may in particular be achieved by controllers in which a plurality of computing cores is used simultaneously. In the following, a concept for parallelizing control tasks of a technical process having a variable number of independently controllable modules is described in which the calculations to be carried out within the framework of the control tasks are distributed to the available computing cores of the controller. The concept allows for parallelizing control tasks so that no specific programming of the control tasks is required for distributed execution on the individual computing cores. The only thing the user has to do is decide in a configuration and initializing phase is to how many or to which computing cores the control task is to be distributed, e.g., how the allocation between the independently controllable modules and the computing cores is to be carried out. The flexible distribution of the control tasks for a number of independently controllable modules allows for shortening the computing time of the controller and hence the cycle time of the control task.

The concept for parallelizing a control task for a number of independently controllable modules of a technical process provides that the modules are each assigned to one computing core on a controller that comprises a plurality of computing cores. The technical process having a number of independently controllable modules is in this context connected to the controller via at least one communication connection for exchanging data. The control cycle is subdivided into three time segments. In the first time segment of the control cycle, the input data of the modules read in via at least one I/O unit of the controller, which is connected to the communication connection, are provided to the computing cores by the controller. The first time segment ends with providing the input data to all computing cores.

The second time segment of the control cycle starts with simultaneously enabling the computing cores to which input data of modules are assigned after all input data are available. The enabled computing cores may e.g. be all computing cores or a subset of all computing cores. In the second time segment, the computing cores then process the input data of the modules that are allocated to the respective computing core in order to generate output data for the modules, wherein each computing core signals the end of processing. As soon as all computing cores have signaled the end of processing, the second time segment of the control cycle is finished.

In the subsequent third time segment of the control cycle, the output data for the modules are provided by the controller in order to be outputted onto the communication connection via the I/O unit of the controller and to be sent to the modules. The control cycle is then finished.

FIG. 1 shows this basic procedure for controlling a technical process involving a majority of independently controllable modules, the modules not being depicted herein. In the following, the present invention is exemplarily described for a number of thirty independently controllable modules. The controller comprises three computing cores C1, C2, C3 that each carry out a control routine. The term 'control routine' refers to the processing/calculation of input data to result in output data by at least one algorithm.

The control routines 100, 110, 120 for the 30 modules are distributed to the three computing cores C1, C2, C3 during configuration, wherein the embodiment shows an equal distribution, e.g., each computing core C1, C2, C3 is responsible for ten modules. Hence, the ten control routines 100 for the first 10 modules are allocated to the first computing core C1. The ten control routines 110 of the second 10 modules are allocated to the second computing core C2 and the ten control routines 120 of the last 10 modules are allocated to the third computing core C3. In order to facilitate allocation of the independently controllable modules to the computing cores C1, C2, C3 for the user of the control task, a computing core C1 may in an initializing phase detect the number and functional characteristics of the independently controllable modules of the technical process.

However, it is not obligatory to equally distribute the control routines 100, 110, 120 of the independently controllable modules to the computing cores C1, C2, C3, particularly when e.g. the independently controllable modules of the technical process are assigned to various functions so that the computing power required for the control routines 100, 110, 120 varies. In that case, allocation of the control routines 100, 110, 120 of the modules to the computing cores C1, C2, C3 may be carried out such that the computing load allocated to the respective computing cores C1, C2, C3 is essentially the same, resulting in an essentially equally long calculation time for the computing cores C1, C2, C3.

It is in principle possible to carry out allocation of the control routines 100, 110, 120 of the modules to the individual computing cores C1, C2, C3 according to any desired predetermined criteria. One allocation criterion may, as has been described, have the purpose of achieving an equal workload for the computing cores C1, C2, C3, essentially to achieve an equally long computing time for all computing cores C1, C2, C3 in order to thus minimize the overall computing time for the control task. If individual modules of the technical process have to meet specific demands, a further criterion when allocating the control routines 100, 110, 120 of the independently controllable modules to the computing cores C1, C2, C3 may be to distribute the control routines 100, 110, 120 of this particular modules to various computing cores C1, C2, C3.

This may be particularly advantageous if modules having specific safety demands are provided for the technical process. The safety criteria for the technical process may e.g. be safeguarded by allocating the control routines 100, 110, 120 of the modules with the specific safety demands to various computing cores C1, C2, C3. It is furthermore possible to carry out the control routines 100, 110, 120 of modules having to meet specific safety demands on a plurality of computing cores C1, C2, C3 in parallel in order to uncover control errors and to avoid these.

In the procedure shown in FIG. 1, the first time segment Z1 and the third time segment Z3 of the control cycle 150, e.g., reading in the input data 130 of the modules via the I/O unit and providing the input data 130 for the respectively allocated computing core C1, C2, C3 or, respectively, providing the output data 140 for the modules after all computing cores C1, C2, C3 have signaled the processing end of the control routines 100, 110, 120, and outputting the output data 140 via the I/O unit by a computing core, are processed by the first computing core C1. By this procedure, it is possible to optimally utilize the hardware of the control. No further units have to be provided processing the first time segment Z1 or, respectively, the third time segment Z3 of the control cycle 150.

Between the first time segment Z1 and the second time segment Z2 of the control cycle 150 and the second time segment Z2 and the third time segment Z3 of the control cycle 150, a synchronization Sync1, Sync2 is respectively carried out, as shown in FIG. 1. Synchronizations Sync1, Sync2 may in this context be carried out by an independent synchronizing unit contained in a control unit of the controller. However, it is also possible that the synchronizations Sync1, Sync2 are carried out jointly by one computing core C1, C2, C3 or, respectively, by all computing cores C1, C2, C3 as a program part of the control task.

During an initializing phase, the synchronizing unit detects the number of all computing cores C1, C2, C3 participating in the process or, respectively, being available. By way of an alternative, the number may be communicated to the synchronizing unit by the controller or a different unit, as well.

For synchronizing Sync1, Sync2, the individual computing cores C1, C2, C3 log on to the synchronizing unit. This is done directly after the respective computing core C1, C2, C3 has carried out the task allocated to it or when no task has been assigned to the respective computing core C1, C2, C3. It is then determined by the synchronizing unit whether the number of computing cores C1, C2, C3 determined in the initializing phase are logged on. If not, the computing core C1, C2, C3 which is in the process of logging on is set to a wait mode. As soon as the last computing core C1, C2, C3 has logged on to the synchronizing unit and the predetermined number of computing cores C1, C2, C3 has thus been reached, all computing cores C1, C2, C3 put into wait mode are returned to active mode. The computing cores C1, C2, C3 then start on the next assigned task.

In the first synchronizing step Sync1 between the first time segment Z1 and the second time segment Z2 of the control cycle 150, the procedure of FIG. 1 is carried out in such a way that the second computing core C2 and the third computing core C3 directly log on to the synchronizing unit. The synchronizing unit which knows from the initializing phase that three computing cores C1, C2, C3 participate in the process then determines that only two computing cores C2, C3 are currently logged on and hence puts the two computing cores C2, C3 in wait mode. As soon as the first computing core C1 has provided the input data 130 of the modules and has thus fulfilled its associated task, the first computing core C1 logs on to the synchronizing unit, as well. The synchronizing unit now determines that all computing cores C1, C2, C3 have logged on and returns the second and the third computing core C2, C3 into active mode. The three active computing cores C1, C2, C3 may then carry out their respectively assigned tasks in the second time segment Z2.

In the second synchronizing step Sync2 between the second time segment Z2 and the third time segment Z3 of the control cycle 150, the procedure of FIG. 1 is then carried out in such a way that the respective computing cores C1, C2, C3 log on to the synchronizing unit directly upon finishing their respectively allocated task. The synchronizing unit determines whether all three computing cores C1, C2, C3 involved in the process are currently logged on, wherein the synchronizing unit knows from the initializing phase that three computing cores C1, C2, C3 are involved in the process. As long as the number of three logged-on computing cores C1, C2, C3 has not been reached, he synchronizing unit puts the computing cores C1, C2, C3 that are in the process of logging on into wait mode. As soon as the last of the three computing cores C1, C2, C3 has finished processing its allocated control routines, said computing core C1, C2, C3 logs on to the synchronizing unit, as well. The synchronizing unit now determines that all computing cores C1, C2, C3 are logged on and returns the other two computing cores C1, C2, C3 to the active mode.

The input data 130 of the modules are provided to the respectively assigned computing core C1, C2, C3 in a memory area of the controller respectively allocated to the computing core C1, C2, C3. The computing cores C1, C2, C3 may then process their respectively assigned task or routine in particular in the second time segment Z2 without blocking or slowing down one another. The memory of the controller may also be configured such that a plurality of computing cores C1, C2, C3 shares a memory area. This is particularly advantageous if the computing cores C1, C2, C3 access shared input data 130.

In the procedure shown in FIG. 1, reading in the input data 130 of the modules is carried out via the I/O unit of the controller and providing the input data is carried out in the memory area assigned to the respective computing core C1, C2, C3 by the first computing core C1 which is for this purpose put into active mode.

Providing the output data for the modules and outputting the output data 140 via the I/O unit of the controller is, in the procedure shown in FIG. 1, again carried out by the first computing core C1. The first computing core C1 is for this purpose put into active mode in order to re-process the output data 140 provided by the computing cores C1, C2, C3 in the assigned memory areas. Within the framework of providing these data, the first computing core C1 may also post-process the output data 140 of the modules, e.g. a scaling or a simple coordinate transformation.

Figure 2:
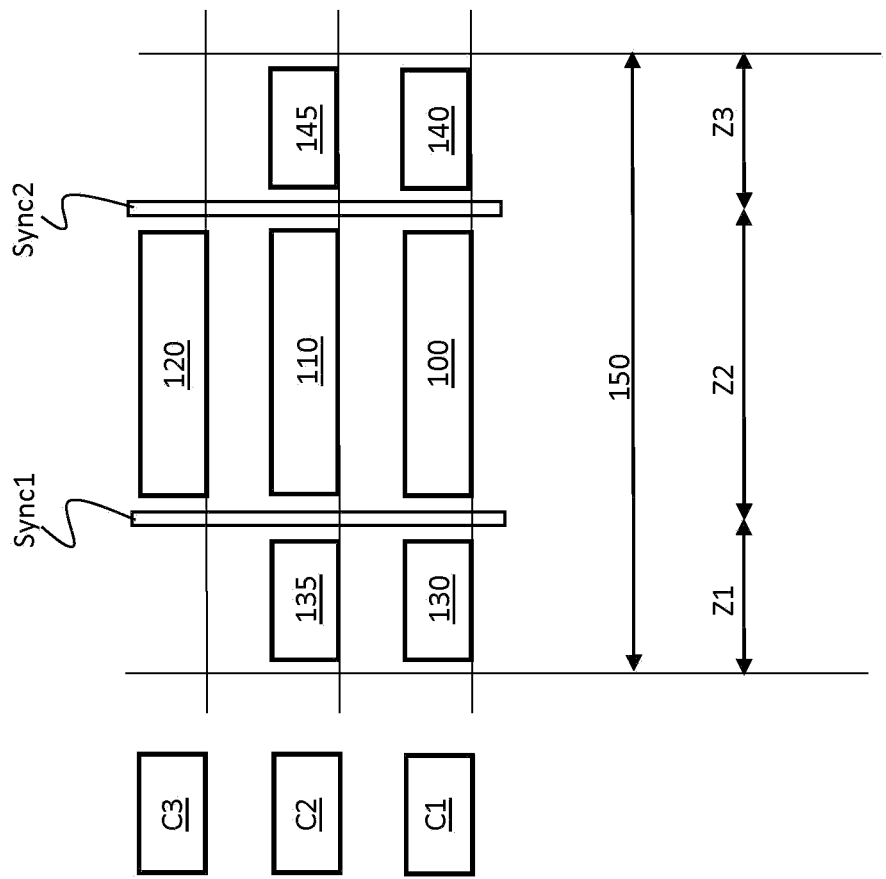
FIG. 2 schematically shows the inventive control cycle of FIG. 1 wherein the controller comprises two communication paths for exchanging data with the technical process.

FIG. 2 shows a potential variation of the procedure of FIG. 1. During the procedure of FIG. 2, two communication connections are provided between the controller and the technical process for exchanging data, wherein each communication path is connected to the controller via an independent I/O unit. As shown in FIG. 2, a computing core is then allocated to each I/O unit—the first computing core C1 to the first I/O unit and the second computing core C2 to the second I/O unit—which then carry out the provision of input data 130, 135 and of output data 140, 145 for the respectively allocated I/O unit in the first time segment Z1 or, respectively, in the third time segment Z3 of the control cycle 150. This procedure is particularly advantageous if a high data load of input data 130, 135 or output data 140, 145 occurs within the framework of the control task. By parallel provision of the input data 130, 135 and/or the output data 140, 145 by two computing cores C1, C2, provision times may be shortened and hence the overall time for the control cycle 150 may be minimized.

Figure 3:
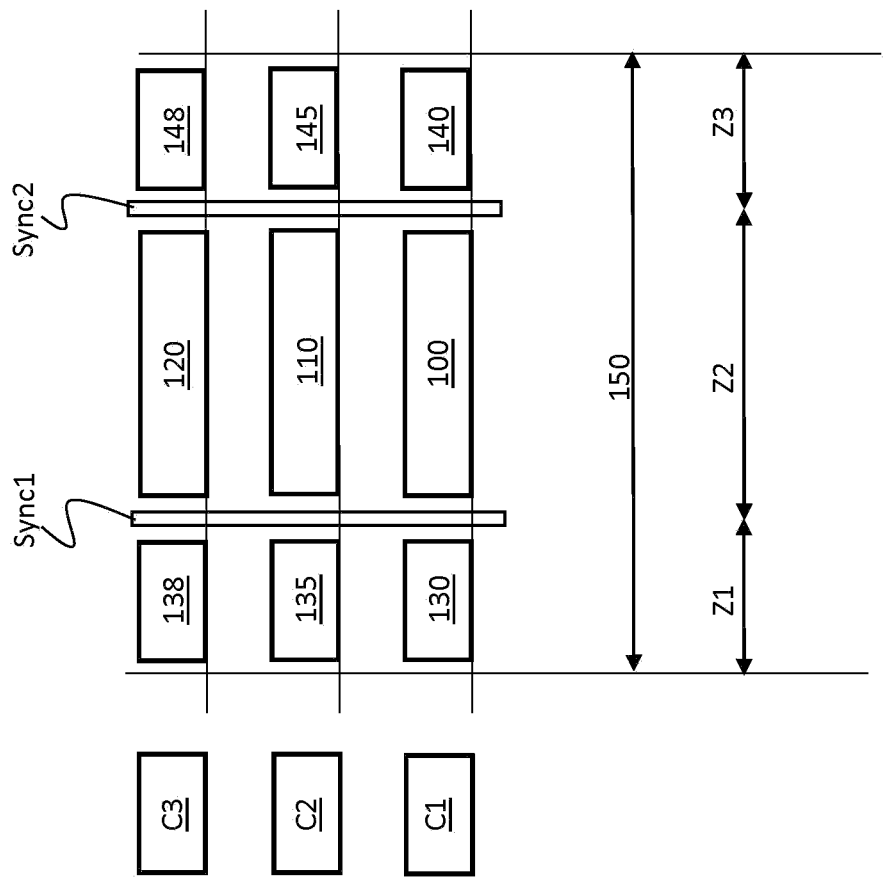
FIG. 3 schematically shows the inventive control cycle of FIG. 1, wherein the controller comprises three communication paths for exchanging data with the technical process.

FIG. 3 shows another variation of the procedure in which three communication paths are provided between the controller and the technical process, each communication path having its own I/O unit in the controller. A computing core C1, C2, C3 is then assigned to each I/O unit—the first computing core C1 to the first I/O unit, the second computing core C2 to the second I/O unit and the third computing core C3 to the third I/O unit. By this procedure, parallelization of providing the input data 130, 135, 138 or, respectively, the output data 140, 145, 148 may be further increased, hence further reducing the overall computing time of the control cycle 150.

Figure 4:
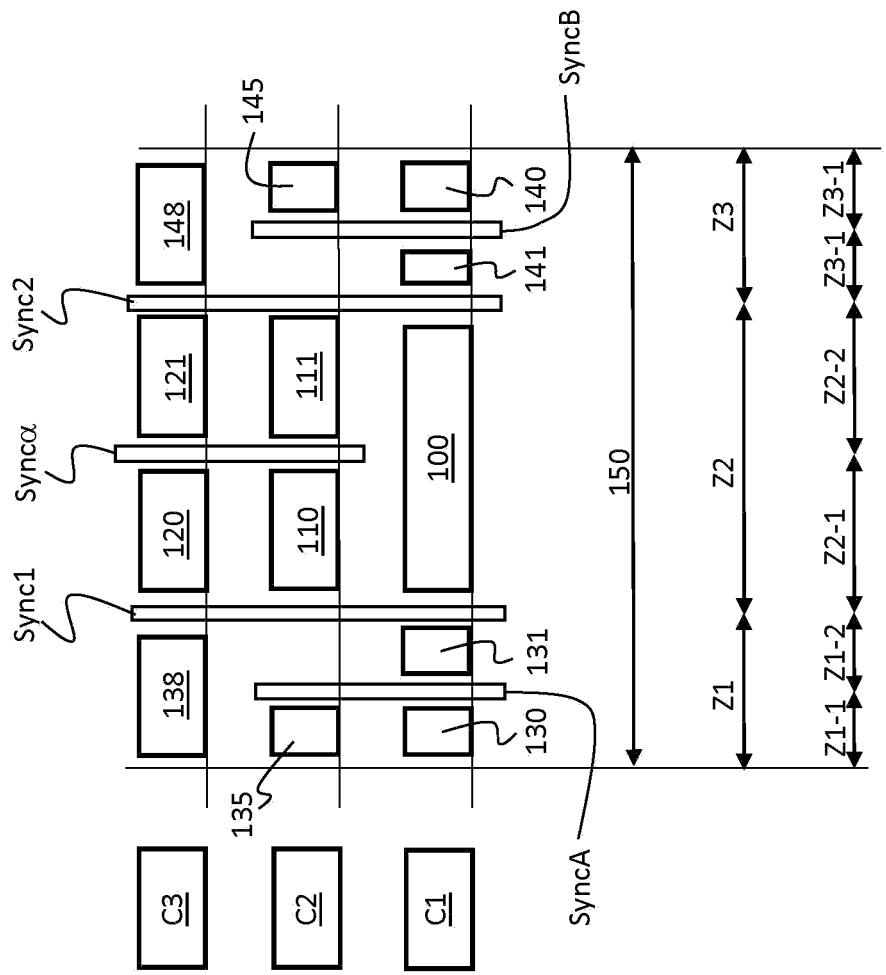
FIG. 4 schematically shows the inventive control cycle of FIG. 1 wherein the controller comprises three communication paths for exchanging data with the technical process and a plurality of synchronizing units are provided.

FIG. 4 shows a further possible variation of the procedure in which, in analogy to FIG. 3, three communication paths are provided between the controller and the technical process. Each communication path, in turn, comprises its own I/O unit in the controller to which a computing core C1, C2, C3 is allocated, the first computing core C1 to the first I/O unit, the second computing core C2 to the second I/O unit and the third computing core C3 to the third I/O unit.

Contrary to the previously described procedures, in the procedure of FIG. 4 the controller has three synchronizing units that manage differing synchronizations Sync1, Sync2, SyncA, SyncB, Syncα independently from one another. The three synchronizing units may be configured as one or as a plurality of independent components, e.g. as a part of the control unit. It is, however, also possible to have the synchronization be carried out by one of computing cores C1, C2, C3 or, respectively, by all computing cores C1, C2, C3 together as a program part of the control task.

As already described for the procedures of FIG. 1 to FIG. 3, the first synchronizing unit controls the two synchronizations Sync1, Sync2 between the first time segment Z1 and the second time segment Z2 or, respectively, between the second time segment Z2 and the third time segment Z3.

The three time segments Z1, Z2, Z3 of the control task may be divided up into sub-time segments to which tasks for the computing cores C1, C2, C3 are respectively allocated which then have to be synchronized. The procedure of FIG. 4 comprises two such sub-time segments for each of the three time segments Z1, Z2, Z3 for two of the three computing cores, respectively. However, it is possible to provide sub-time segments only in individual time segments Z1, Z2, Z3 of the control task and for any desired number of the computing cores C1, C2, C3 in the controller. Furthermore, the number of sub-time segments may of course also be varied depending on the task to be carried out.

In the first time segment Z1 for providing the input data of the modules for the respectively associated computing core by the controller, it may e.g. be necessary to pre-process the input data. In the procedure shown in FIG. 4, this is required for the input data 130, 135 of the first and second I/O unit. For this purpose, the first time segment Z1 is divided up into two sub-time segments Z1-1, Z1-2. The input data 130, 135 of the first two I/O units are processed by the first computing core C1 in a first task or, respectively, by the second computing core C2 in a second task. After finishing their respective task, the first computing core C1 and the second computing core C2 log on to the second synchronizing unit, which is configured analogously to the first synchronizing unit, the second synchronizing unit performing the two synchronizations Sync1, Sync1 between the first time segment Z1 and the second time segment Z2 or, respectively, between the second time segment Z2 and the third time segment Z3. The computing core that logs on to the second synchronizing unit first is put into wait mode until the other computing core has logged on, as well.

The second synchronizing unit knows that two computing cores C1, C2 are involved into pre-processing. This may, in analogy to the first synchronizing unit, be carried out by the second synchronizing unit detecting, in an initializing phase, the computing cores C1, C2 participating in the process. Alternatively, the number may be communicated to the synchronizing unit by the controller or by another unit, e.g. the first synchronizing unit.

When the two computing cores C1, C2 involved into the task have logged on to the second synchronizing unit, the second synchronizing unit thus detects that pre-processing is finished. The second synchronizing unit then carries out synchronization SyncA between the first sub-time segment Z1-1 and the second sub-time segment Z1-2 of the first time segment Z1. The computing core C1 then consolidates the input data 130, 135 in a further task in the second sub-time segment Z1-2 of the first time segment Z1 and then provides the consolidated input data as new input data 131 for further processing.

Since no task is provided for the second computing core C2 in the second sub-time segment Z1-2 of the first time segment Z1, the second computing core C2 directly logs on to the first synchronizing unit and is put into wait mode by the first synchronizing unit. From the initializing phase, the first synchronizing unit knows that in the first time segment Z1 three computing cores C1, C2, C3 are involved in the process. When the first computing core C1, after finishing the further task in the second sub-time segment Z1-2 of the first time segment Z1, and the third computing core C3, after finishing the task of providing the third input data 138 in the first time segment Z1, have logged on to the first synchronizing unit, the first synchronizing unit carries out the first synchronization Sync1 which was already described in conjunction with the procedures of FIG. 1 to FIG. 3.

Analogously to subdividing the first time segment Z1, in the procedure of FIG. 4 the second time segment Z2 is divided up into two sub-time segments Z2-1, Z2-2. The third synchronizing unit responsible for synchronization Syncα between the first sub-time segment Z2-1 and the second sub-time segment Z2-2 of the second time segment Z2 hence carries out synchronization between the first sub-time segment Z2-1 and the second sub-time segment Z2-2 of the second time segment Z2 in analogy to the described process of the first and the second synchronizing unit.

The first computing core C1 processes the input data 131 allocated to the first computing core C1 as well as to the second computing core C2 in the second time segment Z2 on the basis of the first control routine 100 and logs on to the first synchronizing unit upon finishing the task. The second computing core C2, on the other hand, performs two control routines with the input data 131 allocated to it in the second time segment Z2. On the basis of the second control routine 110, the second computing core C2 at first processes the input data 131 in the first sub-time segment Z2-1 of the second time segment Z2 and logs on to the third synchronizing unit after finishing the task.

To the third computing core C3, as well, two control routines for processing the input data 138 assigned to the third computing core C3 are allocated in the second time segment. In the first sub-time segment Z2-1, the third computing core C3 processes the third control routine 120 in the first sub-time segment Z2-1 of the second time segment Z2 with the allocated input data 138 and then, as the second computing core C2, logs on to the third synchronizing unit.

From the initializing phase, the third synchronizing unit knows that two computing cores C2, C3 are involved in the process in the first sub-time segment Z2-1 of the second time segment Z2 of the control task. The third synchronizing unit puts the computing core that carries out its task first into a wait mode. As soon as both computing cores C2, C3 involved in the process have logged on to the third synchronizing unit, the third synchronizing unit carries out synchronization Syncα in order to switch from the first sub-time segment Z2-1 to the second sub-time segment Z2-2.

In the second sub-time segment Z2-2 of the second time segment Z2, the second computing core C2 and the third computing core C3 each carry out a further control routine 111, 121. After finishing the control routines 111, 121, the second computing core C2 or, respectively, the third computing core C3 each log on directly to the first synchronizing unit.

From the initializing phase, the first synchronizing unit knows that in the second time segment Z2 of the control task all three computing cores C1, C2, C3 are involved in the process. The first synchronizing unit will put the respective logging-on computing core into wait mode unless all three computing cores C1, C2, C3 have logged on to the first synchronizing unit. The second synchronization Sync2 is then carried out by the first synchronizing unit Sync2 when switching from the second time segment Z2 to the third time segment Z3, provided all three computing cores C1, C2, C3 have logged on to the first synchronizing unit.

In analogy to the first time segment Z1, the third time segment Z3 for the first and second computing core C1, C2, too, is divided up into two sub-time segments, a first sub-time segment Z3-1 and a second sub-time segment Z3-2, wherein the synchronization is in turn carried out by the second synchronizing unit.

The first computing core C1 provides intermediate output data 141 in the first sub-time segment Z3-1 of the third time segment Z3. As soon as the first computing core C1 has carried out the task, the first computing core C1 logs on to the second synchronizing unit. The second computing core C2, which has not been allocated a task after second synchronization Sync2, immediately logs on to the second synchronizing unit and is put into wait mode.

From the initializing phase, the second synchronizing unit knows that the first computing core C1 and the second computing core C2 are in the third time segment Z3 involved in the process to be monitored by the second synchronizing unit. After the two computing cores C1, C2 have logged on to the second synchronizing unit, the second synchronizing unit carries out the further synchronization SyncB.

After synchronization SyncB, the first computing core C1 and the second computing core C2 process the intermediate output data 141 in order to provide the output data 140, 145. In parallel to the sub-time segments Z3-1, Z3-2 of the third time segment Z3 for the first and second computing core C1, C2, the third computing core C3 carries out the provision of the output data 148 in the third time segment Z3.

By the procedure shown in FIG. 4, parallelizing the provision of the input data 130, 135, 138 or, respectively, of the output data 140, 145 148 in the first time segment Z1 or, respectively, the third time segment Z3 as well as the processing of the control routines in the second time segment Z2 may further be increased and as a result, the total computing time of the control cycle 150 may additionally be reduced.

The concept of parallelized processing of a control task or, respectively, a control routine 100, 110, 120 for a number of independently controllable modules of a technical process stipulates three time segments Z1, Z2, Z3. A first time segment Z1 for reading in and providing the input data 130, 135, 138 of the modules for the respectively allocated computing core C1, C2, C3, a second time segment Z2 for processing the input data to result in output data by the control routines 100, 110, 120 and a third time segment Z3 for providing and outputting the output data 140, 145, 148 for the modules. In all three time segments Z1, Z2, Z3, a plurality of computing cores C1, C2, C3 may be used in parallel for processing. In this context, however, it is not mandatory that all computing cores C1, C2, C3 are always used.

In principle it is possible, depending on the predetermined technical process, e.g., depending on the volume of input and output data 130, 135, 138, 140, 145, 148 and the number of independently controllable modules, to individually set the degree of parallelization in the three time segments Z1, Z2, Z3 of the control cycle 150, e.g., providing the input data, processing the input data to result in output data and providing the output data, in order to advantageously distribute the workload to the computing cores C1, C2, C3 and thus to achieve an optimal reduction of the time involved in the control cycle 150.

In the case of a number of n utilized computing cores, the following variants are conceivable. 1 to n computing cores may be utilized for providing the input or, respectively, output data in the first and third time segment. The computing cores are thereby each allocated to an I/O unit of the controller. Computing cores that are not utilized for providing the input and output data in the first and third time segment of the control cycle directly log on to the synchronizing unit, that may be provided as an independent unit in the controller, but also as a program part on one or, respectively, all computing cores. All computing cores that are not needed are in wait mode or are put into wait mode. In the second time segment of the control cycle in which the input data are processed to output data by control routines, parallel calculation may in turn be carried out by 1 to n computing cores independent of how the allocation of the computing cores to the independently controllable modules of the technical process are configured. Computing cores not carrying out parallel calculation or having finished their calculation in turn log on directly to the synchronizing unit which puts these computing cores from the active mode into wait mode. In principle, further computing cores may of course be provided in the controller that do not participate in the control task or realize other control tasks.

The concept for parallelized processing of a control task of a technical process for a number of independently controllable modules is particularly suitable for motion control in automation tasks in which extremely short cycle times have to be kept in a highly precise manner in order to fulfil real-time conditions. Moreover, motion control usually involves a lot of calculation, wherein, however, identical control algorithms frequently have to be carried out for the independently controllable modules. Furthermore, in motion control a large number of input and output data usually have to be exchanged between the drive system and the controller.

Figure 5:
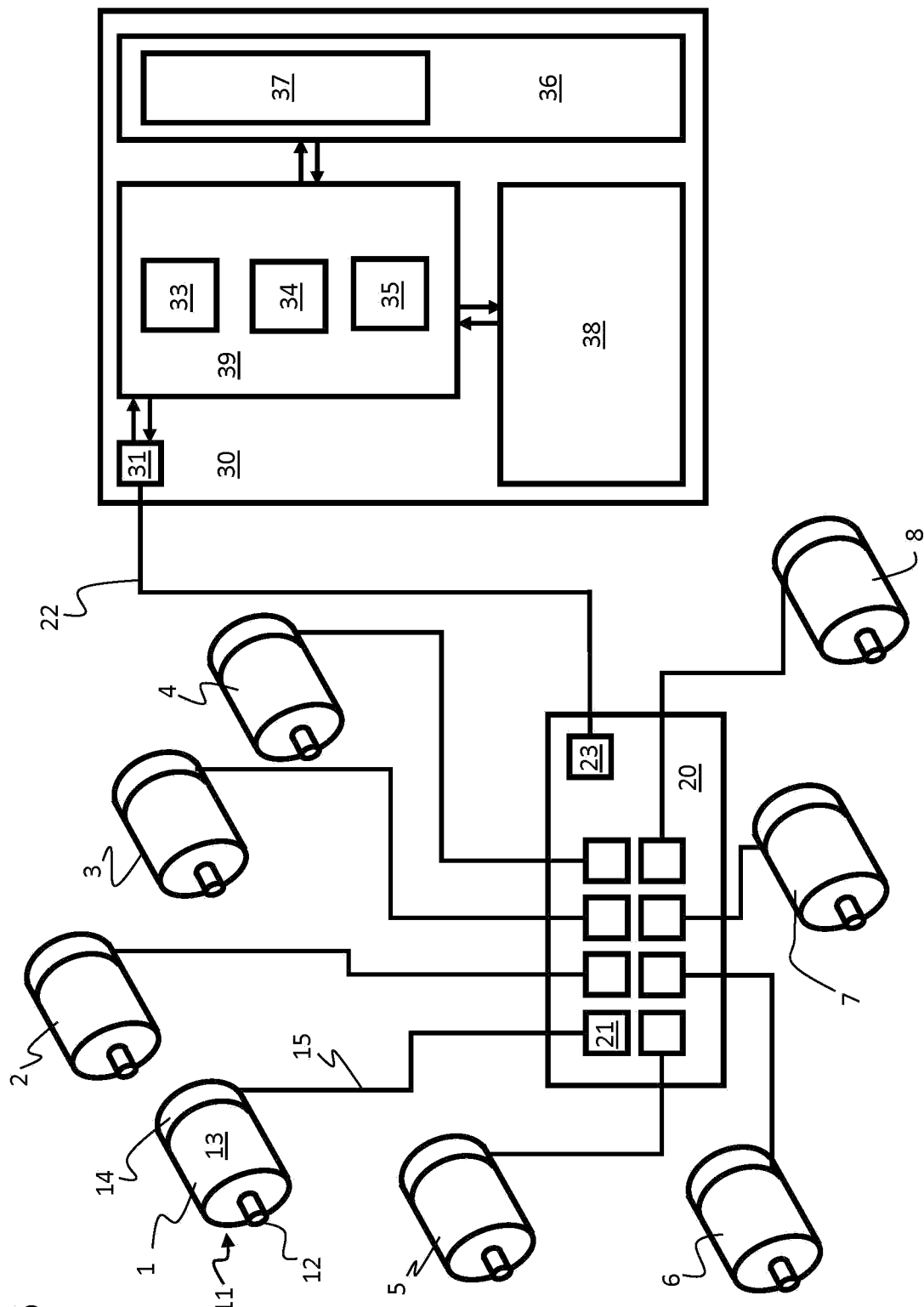
FIG. 5 shows a motion control of eight independently controllable drive elements having the inventive control concept, wherein the control task is carried out by a controller having an I/O unit and three computing cores.

FIG. 5 shows a first application in which the parallelized control concept is used within the framework of a drive system having eight axes 1 to 8. Each axis 1 to 8 in this context comprises a motor 11, as schematically shown in FIG. 5, which comprises a drive shaft 12, a drive with a coil package 13 and a feedback unit 14. Via the feedback unit 14, the input data of the axes, e.g. the transmitter data, are outputted and the output data for the axes, e.g. the current values for accessing the coils in the drive, are received. The feedback units 14 are connected to the controller via a communication connection. In this context, the communication connections are configured such that each feedback unit 14 is connected to a communication path 15.

Alternatively it is possible that instead of feedback units in the motor a communications unit is provided which transmits the input data and transfers the output data to a power element which then drives the coils. It is also conceivable that the power element is arranged separately and has a communication connection with the motor.

The communication lines 15 are connected to terminals 21 having an interface unit 20. The interface unit 20 transfers the data exchanged on the communication lines 15 in parallel into serially running or transferring data packages. The data packages are then exchanged via a further terminal 23 of the interface unit 20, a further communication line 22 established between the interface unit 20 and an I/O unit 31 of the controller 30. For data communication between the interface unit 20 and the I/O unit 31 of the controller, a network protocol such as the EtherCAT protocol that enables fast data exchange is particularly suitable.

In principle, however, it is also possible that the feedback units 14 of the axes 1 to 8 are directly connected to I/O units 31 of the controller 30 without an intermediate interface unit 20. Alternatively, it may also be provided that a plurality of interface units 20, each connected to an I/O unit 31 of the controller 30, is utilized.

In the use case shown in FIG. 5, the controller 30 comprises, apart from the I/O unit 31, a processor 39 having three computing cores 33, 34, 35, a control unit 36 comprising a synchronizing unit 37, and a memory 38. The processor 39 thereby communicates with the I/O unit 31, the control unit 36 and the memory 38 in order to exchange data. The controller may of course comprise further hardware, such as further processors, memories etc.

The controller of the drive system shown in FIG. 5 is configured in such a way that the first computing core 33 in the processor 39 in the controller 30 is assigned the first three axes 1, 2, 3, the second computing core 34 is assigned the three further axes 4, 5, 6 and the third computing core 35 is assigned the remaining two axes 7, 8. Providing the input and output data in the memory 38 is carried out by a first computing core 33 which may access the I/O unit 31 and the controller 30. The switch between the first and second time segment or, respectively, the second and third time segment of the control cycle is triggered by the synchronizing unit 37 of the control unit of the controller 30.

Figure 6:
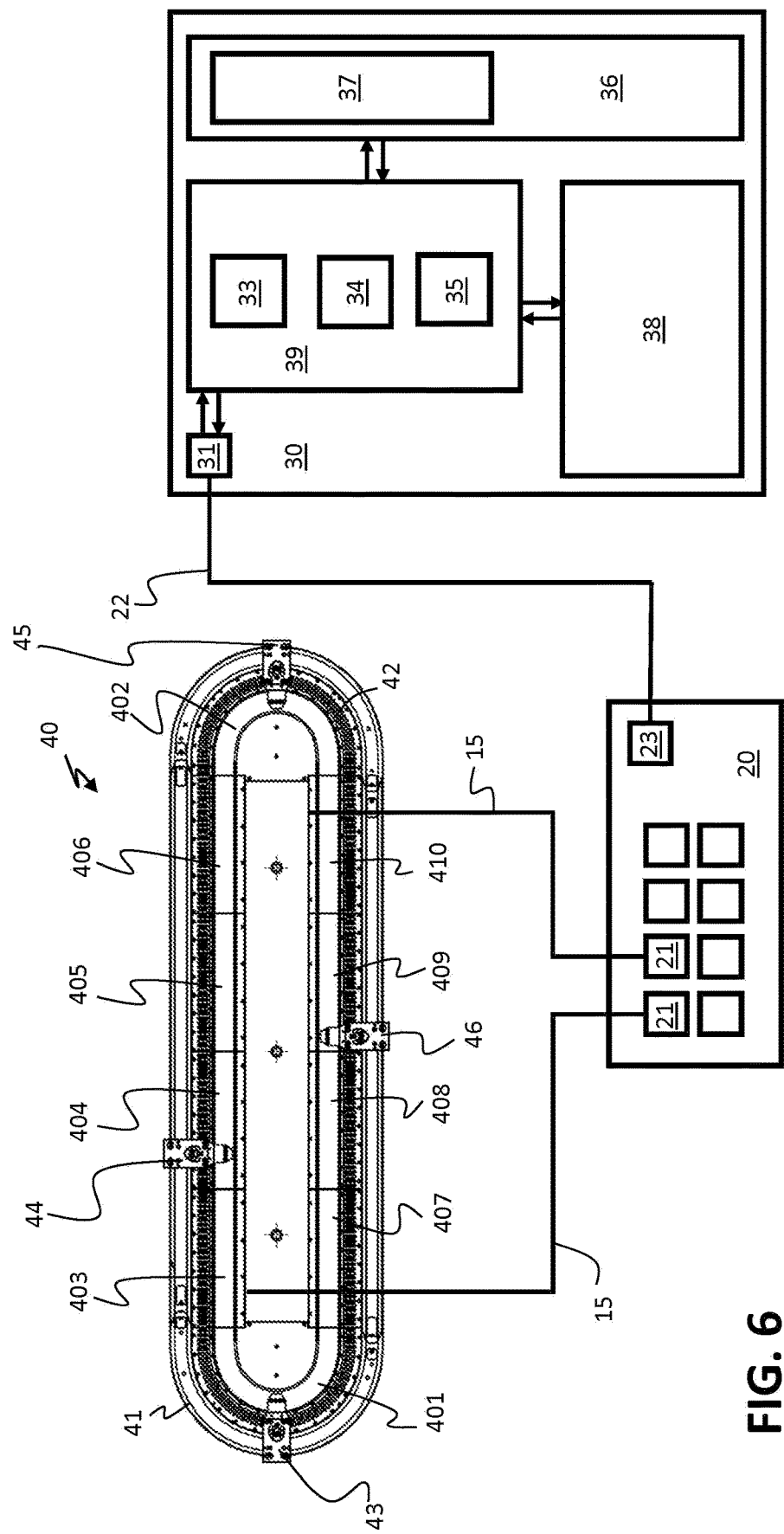
FIG. 6 shows a motion control having the inventive control concept in a linear transport system comprising ten motor modules and four transport elements, wherein two motor modules are feed modules and the control task is carried out by a controller having an I/O unit and three computing cores.

FIG. 6 shows another use case in which the controller 30 with an interface unit 20 shown in FIG. 5 is used for controlling a linear transport system 40. The linear transport system 40 consists of a plurality of motor modules, in the embodiment shown in FIG. 5 of ten motor modules 401 to 410. The motor modules 401 to 410 comprise a travel 41 and a predetermined number of independently energizable drive coils 42 arranged alongside the travel 41. In the embodiment shown in FIG. 6, the motor modules 401 to 410 together form a closed elliptic travel 41, wherein eight motor modules 403 to 410 are straight and two motor modules 401, 402 are curved modules.

On the travel 41 of motor modules 401 to 410, transport elements in the form of slides 43 are arranged which form the independently controllable modules of the technical process. In the embodiment shown in FIG. 6, four such slides 43, 44, 45, 46 are provided. It is in principle possible that any desired number of transport elements that may be accessed independently are arranged on the travel 41.

Each slide 43 to 46 has a magnetic unit in order to be moved by the drive coils 42 of the motor modules 401 to 410 by a migrating magnetic field. Controlling of the slides 43 to 46 is carried out by controlling the energizing of the drive coils 42 in the motor modules 401 to 410. As input data for the controller 30, the motor modules 401 to 410 provide positional data of the slides 43 to 46 which are detected by position-detecting units arranged at the motor modules 401 to 410.

In the use case shown in FIG. 6, the data exchange takes place via specifically labelled motor modules 403, 410 that are also referred to as feed modules. Via the feed modules, the further motor modules 401, 402, 404 to 409 that are connected to the feed module then exchange data with the controller 30. The motor modules 401 to 410 are interconnected with the feed modules via a communications line. In the use case shown in FIG. 6, two motor modules 403, 410 are provided as feed modules that are each responsible for the data exchange of five further motor modules 401, 402, 404 to 409. In principle, it is, however, possible that each motor module 401 to 410 is independently connected to the controller 30 directly via a communications line 15 or via the intermediate interface unit 20.

The controller of the linear transport system 40 of FIG. 5 is configured in such a way that the first or the third time segment of the control cycle, the provision of the input and output data from one computing core, is carried out by the first computing core 33 of the controller 30, which may access the I/O unit 31. Calculating the control data for the individual slides 43 to 46 is then carried out in parallel by the three computing cores 33, 34, 45 of the processor 39, wherein two slides 43, 44 are allocated to the first computing core 33, a further slide 45 is allocated to the second computing core 34 and the last slide 46 is allocated to the third computing core 35.

The parallelized control concept is particularly advantageous for linear transport systems as very short cycle times have to be kept and a multitude of input and output data have to be processed. Moreover, the input and output data of the motor modules may always be allocated to other motor modules in a simple manner. Such a re-allocation is required if the slide position between the various motor modules is changed. In addition, high safety demands concerning the accessing of the individual transport elements often have to be observed in linear transport systems if they are used within the framework of manufacturing processes. By a corresponding configuration and distribution of the calculation or, respectively, by the possibility of calculate the output data for a transport element multiple times and on various computing cores such safety demands may be kept in a reliable manner.

Figure 7:
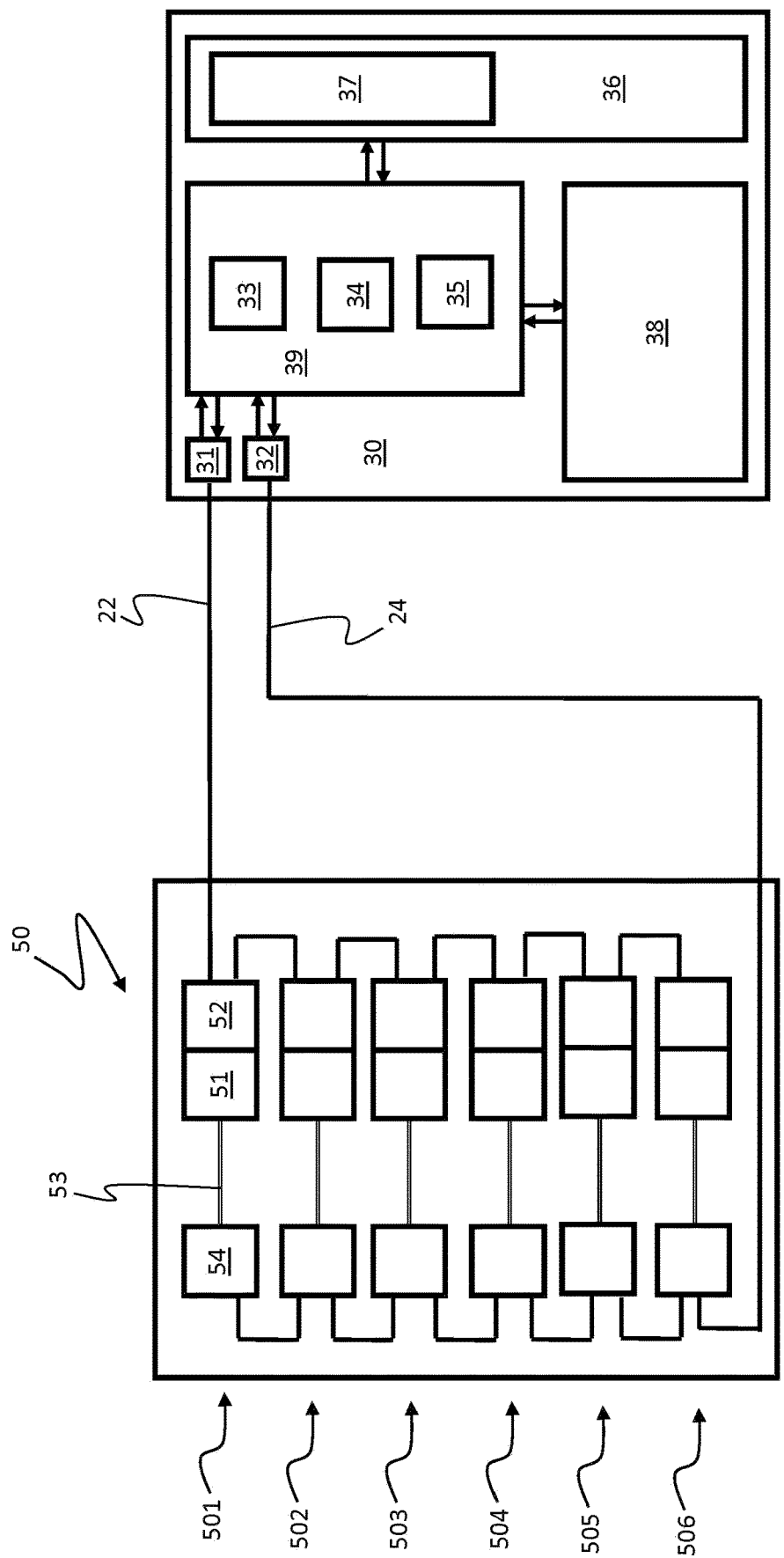
FIG. 7 shows a motion control having the inventive control concept in a six-axis-robot system wherein the control task is carried out on a controller having two I/O units and three computing cores.

FIG. 7 shows a further use case for a multiple-axis robot 50—in the present case a six-axes robot—in which for each of the six axes 501 to 506 a position and speed control is carried out. Each robot axis 501 to 506 comprises a motor 51 having a connected converter unit 52 which is connected to a feedback unit 52 via a mechanical connection 53. The feedback unit 54 and the converter unit 52 at the motor 51 exchange input and output data with the controller. The converter units 52 and the feedback units 54 of the individual robot axes 501 to 506 are in this context separately connected to the controller 30 via a dedicated communication connection 22, 24, the controller therefor comprising two I/O units 31, 32, wherein the first I/O unit 31 inputs and outputs input and output data for the converter units via the first communication connection 22 and the second I/O unit 32 inputs and outputs input and output data for the feedback units via the second communication connection 24.

In the use case shown in FIG. 7, the provision of input and/or output data to be carried out in the first and third time segment of the control cycle is carried out separately by one computing core, respectively, wherein the first I/O unit 31 with the input and output data for the converter units is allocated to the first computing core 33 and the second I/O unit 32 with the input and output data for the feedback units is allocated to the second computing core 34.

Calculation of the output data on the basis of the input data for the individual robot axes 501 to 506 is carried out in parallel by all three computing cores 33, 34, 35, wherein the first computing core 33 is allocated to the first two axes 501, 502, the second computing core 34 is allocated to the further two axes 503, 504 and the third computing core 35 is allocated to the remaining two axes 505, 506.

By the inventive parallelized control concept, control tasks may generally be flexibly and reliably processed by a plurality of individually controllable modules of a technical process, wherein short cycle times may be achieved by the possibility of variably configuring the parallelization when providing the input and output data as well as when calculating the output data on the basis of the input data.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for controlling a technical process comprising:
   a control task for a number of independently controllable modules, wherein the modules are each respectively assigned to a computing core on a controller that has a plurality of such computing cores, at least two of the modules being assigned to two different computing cores of the computing cores;
   wherein the technical process is connected to the controller via at least one communication connection in order to exchange data;
   wherein in a first time segment, the controller provides read-in input data of the modules for the respectively assigned computing core via at least one I/O unit, the at least two modules being assigned to the two different computing cores;
   wherein subsequently a synchronization of the computing cores to which the modules are assigned is carried out by the controller, the at least two modules being assigned to the two different computing cores;
   wherein in a second time segment the computing cores process the input data of the modules that are assigned to the respective computing cores in order to generate output data for the modules, the at least two modules being assigned to the two different computing cores;
   wherein each computing core signals the end of processing; and
   wherein as soon as all computing cores have signaled the end of processing, the output data for the modules are provided in a third time segment by the controller in order to be provided to the modules on the communication connection by the I/O unit.

2. The method of claim 1, wherein the controller comprises a number n of said computing cores used within the framework of the control task and the synchronization, wherein the following steps are carried out within the framework of a control cycle:
   providing of input data of the modules detected by the controller via the at least one communication connection for the respectively assigned computing core in the first time segment by the controller,
   wherein 1 to n computing cores are used for providing the input data,
   wherein the computing cores of the 1 to n computing cores that are not used for providing the input data log on for the synchronization and are put into wait mode,
   wherein the 1 to n computing cores that are used for providing the input data log on for the synchronization after carrying out the assigned control task, and
   wherein the respective computing core is put into wait mode as long as not each of the n computing cores is logged on for synchronization;
   synchronizing of the n computing cores as soon as the n computing cores are logged on for synchronization, wherein all computing cores put into wait mode are returned to the active mode;
   processing the input data of the modules by the respectively assigned computing core in the second time segment in order to generate output data for the modules,
   wherein computing cores that are not used for processing the input data of the modules log on for synchronization and are put into wait mode,
   wherein the computing cores that are used for processing the input data of the modules log on to synchronization after carrying out their assigned control task, and
   wherein the respective computing core is put into wait mode as long as not each of the n computing cores is logged on for synchronization;
   synchronizing of the n computing cores as soon as the n computing cores are logged on for synchronization, wherein all computing cores put into wait mode are returned to the active mode; and
   providing, in the third time segment, the output data for the modules by the controller for outputting the output data for the modules on the at least one communication connection by the controller,
   wherein for providing the output data 1 to n computing cores are used,
   wherein the computing core of the 1 to n computing cores that are not used for providing the output data log on for synchronization and are put into wait mode,
   wherein the 1 to n computing cores that are used for providing the output data log on for synchronization after carrying out the assigned control task, and
   wherein the respective computing core is put into wait mode as long as not each of the n computing cores is logged on for synchronization.

3. The method of claim 1, wherein at least one of the steps of providing the input data, processing the input data to result in output data and providing the output data is divided up into at least two segments to each of which at least one control task is assigned, wherein the computing cores used in the at least two segments are synchronized between the two segments in which, as soon as the computing cores used in the at least two segments are logged on for synchronization, all computing cores put into wait mode are returned into the active mode.

4. The method of claim 1, wherein the synchronization is configured as one or a plurality of independent components or is executed on one of or on the plurality of computing cores as a program part of the control task.

5. The method of claim 1, wherein the input data of the modules with the respectively assigned computing cores are provided in an associated memory area, wherein the plurality of computing cores shares a memory area.

6. The method of claim 1, wherein in an initializing phase, a computing core detects the independently controllable modules of the technical processes and assigns each of the detected modules to one computing core according to at least one predetermined criterion.

7. The method of claim 6, wherein independently controllable modules are distributed to different computing cores with specific safety demands.

8. The method of claim 1,
   wherein the technical process has a plurality of communication connections with the controller for exchanging data; and
   wherein the provision of the input data read in via the respective communication connection and the provision of the output data to be read out is carried out by a computing core associated with the communication connection.

9. The method of claim 1, wherein the technical process comprises a motion control for the independently controllable modules.

10. A controller for a technical process comprising:
    a control task for a number of independently controllable modules, wherein the modules are each assigned to a respective computing core on the controller that has a plurality of such computing cores, at least two of the modules being assigned to two different computing cores of the computing cores;

wherein the technical process is connected to the controller via at least one communication connection in order to exchange data;

wherein in a first time segment, the controller provides read-in input data of the modules for the respectively assigned computing core via at least one I/O unit, the at least two modules being assigned to the two different computing cores;

wherein subsequently a synchronization of the computing cores to which the modules are assigned is carried out by the controller, the at least two modules being assigned to the two different computing cores;

wherein in a second time segment the computing cores process the input data of the modules that are assigned to the respective computing cores in order to generate output data for the modules, the at least two modules being assigned to the two different computing cores;

wherein each computing core signals the end of processing; and wherein as soon as all computing cores have signaled the end of processing, the output data for the modules are provided in a third time segment by the controller in order to be provided to the modules on the communication connection by the I/O unit.

11. The controller of claim 10, comprising:

a number n of said computing cores used within the framework of the control task, wherein the modules are each assigned to one of the n computing cores;

at least one I/O unit configured to exchange data with the technical process via the communication connection;

wherein the controller is configured to provide the input data of the modules detected via the I/O module to the respectively assigned computing cores in the first time segment and to synchronize the computing cores to which modules are assigned if the input data are available, wherein for providing the input data 1 to n computing cores are used, wherein the computing cores of the 1 to n computing cores that are not used for providing the input data log on for synchronization and are put into wait mode, wherein the 1 to n computing cores that are used for providing the input data log on for synchronization after carrying out their assigned control task, wherein the respective computing core is put into wait mode as long as not each of the n computing cores is logged on for synchronization, and wherein for synchronizing the n computing cores as soon as the n computing cores are logged on for synchronization all computing cores put into wait mode are returned into the active mode;

wherein the computing cores are configured to process the associated input data of the modules after synchronization in the second time segment in order to generate output data for the modules, wherein each computing core signals the end of processing, wherein computing cores that are not used for processing the input data of the modules log on for synchronization and are put into wait mode, wherein the computing cores that are used for processing the input data of the modules log on for synchronization after carrying out the assigned control task, and wherein the respective computing core is put into wait mode as long as not each of the n computing cores is logged on for synchronization; and wherein the controller is configured, once all computing cores have signaled the end of processing, to provide the output data for the modules in the third time segment in order to output the output data on the communication connection via the I/O module, wherein for providing the output data 1 to n computing cores are used, wherein the computing cores of the 1 to n computing cores that are not used for providing the output data log on for synchronization and are put into wait mode, wherein the 1 to n computing cores that are used for carrying out the assigned control task log on for synchronization, and wherein the respective computing core is put into wait mode as long as not each of the n computing cores is logged on for synchronization.

12. The controller of claim 10, wherein the controller is configured to divide up at least one of the steps of providing the input data, processing the input data to result in output data and providing the output data into at least two segments to which one control task is each assigned; and wherein by the computing cores used in the at least two segments a synchronization process is carried out by the synchronization (SyncA, SyncB, Syncα) between the two segments in which as soon as the computing cores used in the at least two segments are logged on for synchronization, all computing cores put into wait mode are returned to the active mode.

13. The controller of claim 10, wherein the synchronization is configured as one or a plurality of independent components or executed on one of or on the plurality of computing cores as a program part of the control task.

14. The controller of claim 13, wherein the controller comprises a memory in which each computing core is provided with a memory area in which the input data of the modules are available for the computing core, wherein the plurality of computing cores shares a memory area.

15. The controller of claim 10, wherein a computing core is configured, in an initializing phase, to detect the independently controllable module of the technical process and assigns each of the detected modules to a computing core according to at least one predetermined criterion.

16. The controller according to claim 10, having a plurality of I/O units that are each configured to exchange data with a technical process via an associated communication connection; and wherein each I/O unit is assigned a computing core configured to carry out the provision of the input and output data for the respectively assigned I/O unit.

17. The controller according to claim 10, wherein the controller is configured to carry out a motion control of the independently controllable modules.

18. A drive system comprising a number of independently controllable drive elements and a controller, the controller having a plurality of computing cores, at least two of the drive elements being assigned to different computing cores of the plurality of computing cores, at least one I/O unit of the controller is configured to exchange data with the drive elements via a communication connection;

wherein in a first time segment, the controller provides read-in input data of the drive elements for the respectively assigned computing core via at least one I/O unit;

wherein subsequently a synchronization of the computing cores to which the drive elements are assigned is carried out by the controller;

wherein in a second time segment the computing cores process the input data of the drive elements that are assigned to the respective computing core in order to generate output data for the drive elements;

wherein each computing core signals the end of processing; and wherein as soon as all computing cores have signaled the end of processing, the output data for the drive elements are provided in a third time segment by the controller in order to be provided to the modules on the communication connection by the I/O unit.

19. The drive system of claim 18, having a plurality of motor modules that each comprise a travel path and a plurality of independently driveable driving coils arranged alongside the travel path, wherein the drive elements each comprise a magnetic unit in order to be moved by the driving coils, and wherein a number of motor modules from the plurality of motor modules is configured as feed modules for the plurality of motor modules that are each connected to the controller via a communications line.

20. The drive system of claim 18, wherein the I/O unit of the controller is configured to exchange data via a plurality of communication paths.

* * * * *